United States Patent [19]

Nielsen

[11] Patent Number: 5,892,919
[45] Date of Patent: Apr. 6, 1999

[54] SPELL CHECKING UNIVERSAL RESOURCE LOCATOR (URL) BY COMPARING THE URL AGAINST A CACHE CONTAINING ENTRIES RELATING INCORRECT URLS SUBMITTED BY USERS TO CORRESPONDING CORRECT URLS

[75] Inventor: Jakob Nielsen, Atherton, Calif.

[73] Assignee: Sun Microsystems, Inc., Palo Alto, Calif.

[21] Appl. No.: 880,531

[22] Filed: Jun. 23, 1997

[51] Int. Cl.[6] .................................................. H04L 12/00
[52] U.S. Cl. .............................. 395/200.58; 395/200.75; 707/533
[58] Field of Search .................... 395/200.48, 200.58, 395/200.75; 707/5, 533; 711/118, 126

[56] References Cited

U.S. PATENT DOCUMENTS

| | | | |
|---|---|---|---|
| 4,290,105 | 9/1981 | Cichelli et al. ......................... | 364/200 |
| 5,227,778 | 7/1993 | Vacon et al. ....................... | 340/825.52 |
| 5,404,505 | 4/1995 | Levinson ................................. | 395/600 |
| 5,404,510 | 4/1995 | Smith et al. ............................. | 395/600 |
| 5,551,046 | 8/1996 | Mohan et al. ........................... | 395/800 |
| 5,717,915 | 2/1998 | Stolfo et al. ............................ | 395/605 |
| 5,731,805 | 3/1998 | Tognazzini et al. .................... | 345/156 |
| 5,754,791 | 5/1998 | Dahlgren et al. .................. | 395/200.72 |
| 5,761,436 | 6/1998 | Nielsen .............................. | 395/200.75 |
| 5,774,660 | 6/1998 | Brendel et al. ..................... | 395/200.31 |
| 5,787,470 | 7/1998 | DeSimone et al. ..................... | 711/124 |
| 5,796,952 | 8/1998 | Davis et al. ....................... | 395/200.54 |
| 5,826,031 | 10/1998 | Nielsen ................................. | 39/200.63 |

*Primary Examiner*—Lance Leonard Barry, Esq.
*Attorney, Agent, or Firm*—McDermott, Will & Emery

[57] ABSTRACT

A cache, storing misspelled or otherwise incorrect network addresses from a plurality of users and associated correct network addresses, is maintained at a proxy server or internet service provider. Addresses received from all users are checked against the cache to correct any misspellings or other situations in which the network address might be incorrect. The cache is periodically pruned of entries which aren't frequently used. The collective experience of a group of users can thus be utilized to correct a network address submitted by a user who has never visited a particular network address before.

20 Claims, 11 Drawing Sheets

SPELL CHECKING UNIVERSAL RESOURCE LOCATOR (URL) BY COMPARING THE URL AGAINST A CACHE CONTAINING ENTRIES RELATING INCORRECT URLS SUBMITTED BY USERS TO CORRESPONDING CORRECT URLS

CROSS REFERENCE TO RELATED APPLICATIONS

This application is related to U.S. patent application Ser. No. 08/668,877, filed Jun. 24, 1996 entitled CLIENT-SIDE, SERVER-SIDE AND COLLABORATIVE SPELL CHECK OF URL'S filed by Jakob Nielsen which is hereby incorporated by reference in its entirety.

BACKGROUND OF THE INVENTION

1. Field of the Invention

This invention relates to information retrieval over a network, and, more specifically, to spell checking of network addresses used to retrieve information.

2. Description of Related Art

In order to access specific networked information such as World-Wide-Web (WWW) pages, users must often enter a network address such as a Universal Resource Locator (URL) which identifies the location of the page on a remote server. However, as network browsers evolved, the focus of the user interface has been to allow users to access remote pages by selecting hypertext links, thus often removing the need to manually enter URLs. Scant attention has been paid to the problems inherent in manual URL entry. Yet, the explosive growth of networked information systems such as the WWW has made it inconvenient to follow a long series of hypertext links to retrieve the page desired by the user. In fact, companies, organizations and individuals often provide their URLs in television advertisements, on printed materials, and verbally. This has led to a growing number of instances when the user needs to manually enter the URL into a browser for retrieval.

A major problem with the manual entry of URLs is the introduction of spelling errors, which are particularly common because of the characteristics of URL syntax and structure. Often long, the URL includes terms, such as "http", "com", "org", "gif", "jpeg", that are not commonly known by users. URLs may also be in a foreign language, especially for users in non-English speaking countries. Additionally, the URL may include odd special characters such as ~, ^, and @ that are difficult to type and hard to remember. The fact the URLs interpret upper and lower case letters differently is yet another source of user input error. Often the user is often relying on a quickly made note or just his memory from a brief appearance or spoken URL in an advertisement. Additionally, the URL may be misspelled in advertising, email, or even hypertext links and inadvertently point to other WWW pages. All of these factors taken together provide a rich basis for the introduction of spelling errors. A user who tries to follow a misspelled network address will not get the intended information even if the misspelling is a minor one. Since misspelling on the Web frequently occurs in peaks, there is a desire to enhance the efficiency of URL spell checking.

In order to assist the user with URL spelling errors a spelling checker is needed. Spell checking in general is well established in the art, with numerous implementation schemes. The central idea of a spell checker is to take the word in question and compare it to a dictionary of spellings known to be correct to find one or more words that are spelled roughly the same way and to then provide the user the ability to chose the correct word from a list presented by the spelling checking program.

Caching of items that are frequently referenced is known. Various algorithms, including hashing, allow for the quick retrieval of an item stored in a cache.

However, spell checkers of the prior art, are unsuitable for use in a network environment, such as the WWW environment, for several reasons. The dynamic nature of the WWW, where new URLs are constantly being created, precludes the use of a static dictionary. The sheer number of URLs precludes the use of a dynamic dictionary: as of April 1996 there were more than 30 million URLs on the WWW. Additionally, since the WWW operates in a client-server environment, only the server knows what URLs are valid for accessing WWW pages residing on that server. Finally, the prior art provides no mechanism for utilizing knowledge obtained from other user's behavior.

As an example of the state of the prior art, Netscape's Navigator WWW browser performs a simplistic spelling check on manually entered URLs. Specifically, the program tries to identify and correct problems with the protocol and the server's domain name. The program will try adding "http://" to the URL if no protocol is specified, it will also add "www." before and ".com" after the domain name if they are not present in the manually entered URL. These spelling check variations are helpful but not sufficiently robust or extensive to solve the general problem of spelling errors in manually entered URLs.

THE PROBLEMS

Thus the prior art fails to provide for spell checking which is suitable for network environments such as the World Wide Web. The prior art only provides rudimentary spell checking for network addresses which results in high numbers of misspelled URLs notwithstanding the rudimentary spell checking. The prior art fails to provide any mechanism for combining the experience of a plurality of users into an adaptive spell checker. The prior art does not provide a mechanism for correcting misspelling a network address which appears in the mass media resulting in a large number of misspellings.

SUMMARY OF THE INVENTION

The present system provides apparatus, systems, methods and computer program products which provide a user who manually enters a network address with a sophisticated method for correcting a misspelling of that address.

In accordance with one aspect of the invention, maintaining a cache of recent URL misspellings provides a quick way to trap spelling errors that occur frequently. If, for example, an advertisement for a popular product or service contains a misspelled URL, then cached spell checking will minimize user inconvenience by transparently correcting the URL and instructing the browser to return the document addressed by the corrected URL.

In another aspect of the invention, cached spell checking may utilize spell check mechanisms of the prior art or those of the aforementioned co-pending application to cooperatively provide enhanced spell check functionality.

The invention relates to computer apparatus for checking network addresses used for retrieval of information. The apparatus includes a users' interface for receiving connections from a plurality of users, a network interface for providing network access to the users, and a computer controlling the users' interface and the network interface, to provide checking of at least one network address by comparing that address with a cache containing entries relating incorrect addresses submitted by users and corresponding corrected addresses.

The inventions also relates to a system for retrieving information over a network in response to network addresses which includes a network, at least one server connected to the network and a computer providing network access to a plurality of users. The computer maintains a cache of entries relating incorrect addresses submitted by users with correct network addresses.

The invention also relates to a method of retrieving information over a network, by comparing at least one network address with a cache containing entries relating incorrect addresses submitted by a plurality of users and corresponding corrected addresses.

The invention also relates to computer program products embodying the techniques of the invention and to the transmission of those products over a network.

The foregoing and other features, aspects and advantages of the present invention will become more apparent from the following detailed description of the present invention when taken in conjunction with the accompanying drawings.

BRIEF DESCRIPTION OF THE DRAWINGS

The object, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1A:
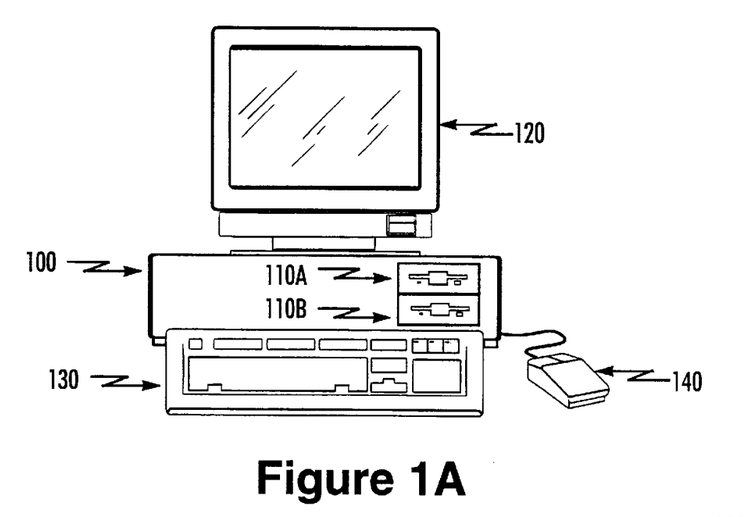
FIG. 1A illustrates a computer of a type suitable for carrying out the invention.

FIG. 1A illustrates a computer of a type suitable for carrying out the invention. Viewed externally in FIG. 1A, a computer system has a central processing unit 100 having disk drives 110A and 110B. Disk drive indications 110A and 110B are merely symbolic of a number of disk drives which might be accommodated by the computer system. Typically, these would include a floppy disk drive such as 110A, a hard disk drive (not shown externally) and a CD ROM drive indicated by slot 110B. The number and type of drives varies, typically, with different computer configurations. The computer has the display 120 upon which information is displayed. A keyboard 130 and a mouse 140 are typically also available as input devices. Preferably, the computer illustrated in FIG. 1A is a SPARC workstation from Sun Microsystems, Inc.

Figure 1B:
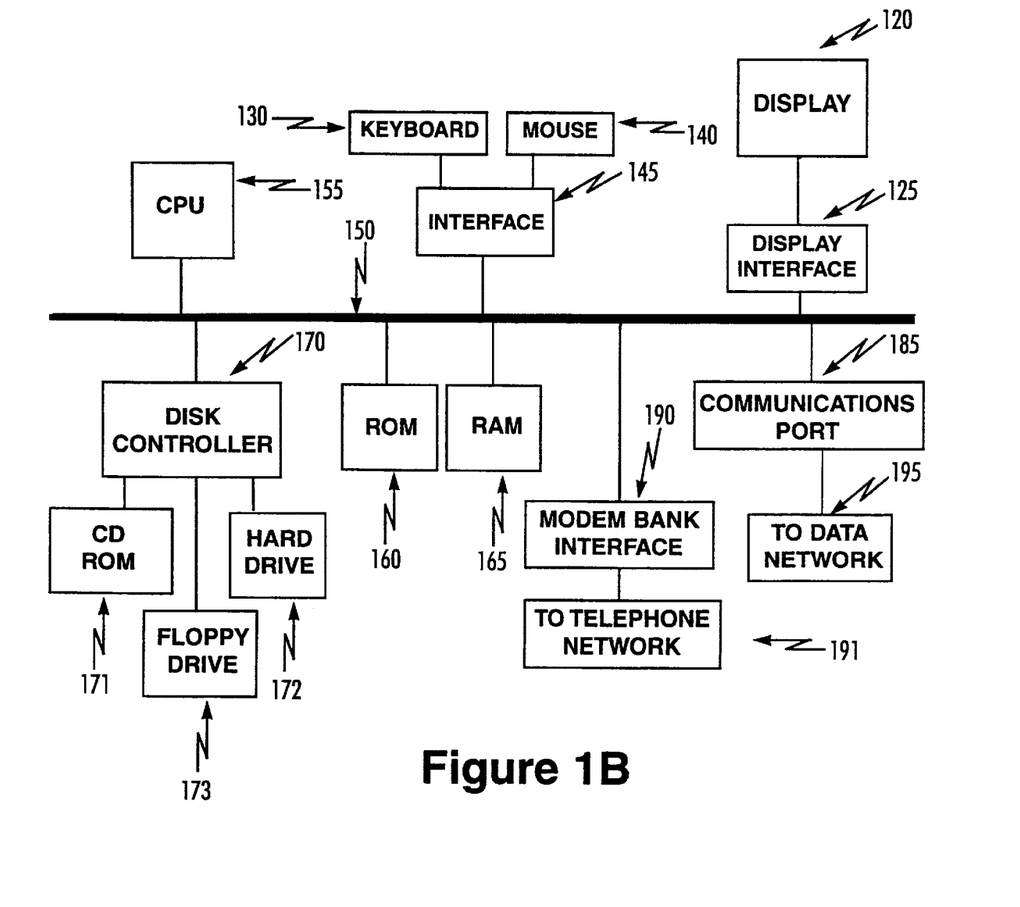
FIG. 1B illustrates a block diagram of the computer of FIG. 1A.

FIG. 1B illustrates a block diagram of the internal hardware of the computer of FIG. 1A. A bus 150 serves as the main information highway interconnecting the other components of the computer. CPU 155 is the central processing unit of the system, performing calculations and logic operations required to execute programs. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. A display interface 175 interfaces a display 120 and permits information from the bus to be viewed on the display. A modem bank interface (190) is used if the computer is configured as a proxy or an Internet Service Provider (ISP). The modems of the modem bank are connected to a telephone network (191) in the usual manner. Communications with a network 195 or with other external devices can occur over communications port 185.

Figure 1C:
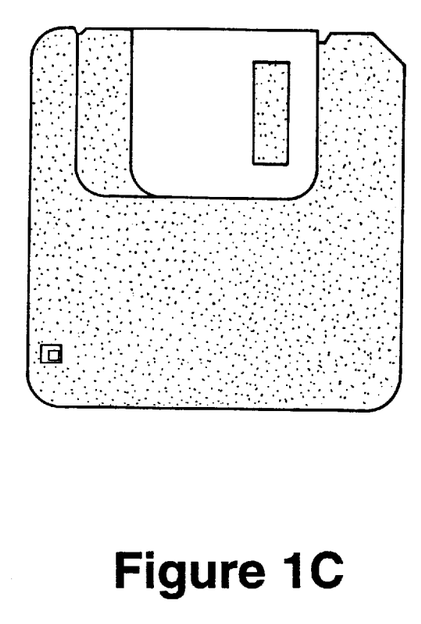
FIG. 1C illustrates an exemplary memory medium containing on or more programs usable with the computer of FIG. 1A.

FIG. 1C illustrates an exemplary memory medium which can be used with drives such as 173 in FIG. 1B or 110A in FIG. 1A. Typically, memory media such as a floppy disk, CD ROM, or Digital Video Disk will contain the program information for controlling the computer to enable the computer to performs its functions in accordance with the invention.

Figure 2A:
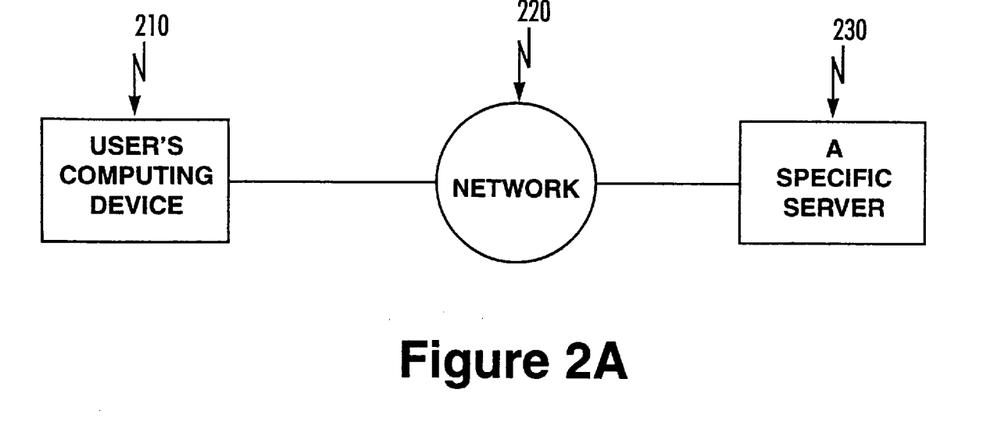
FIGS. 2A and 2B illustrate exemplary network environments in which spell checking in accordance with the invention may be usefully employed.
Figure 2B:
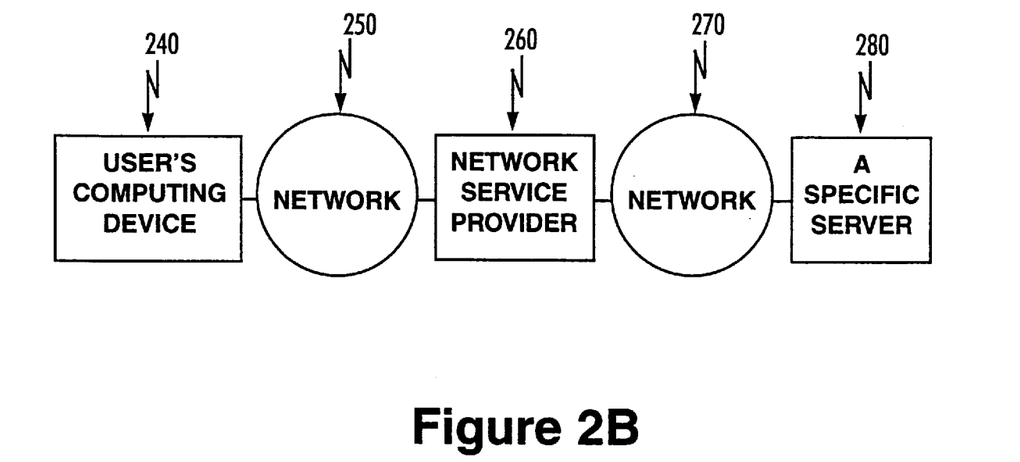

Exemplary environments in which the techniques of the invention can be usefully employed are illustrated in FIGS. 2A and 2B. In the simplest environment (FIG. 2A) the user's computing device (210), running a network browser such as a WWW browser software, is attached to a network (220). The specific network (e.g. WWW) server (230) the user wants to access is attached to the same network. A more complex environment is depicted in FIG. 2B where a user's computing device (240) is attached to a network such as a telephone network (250) that is attached to an Internet Service Provider (ISP) proxy server (260) which is, in turn, connected to another network (270) which provides connections to desired servers (280).

Figure 3:
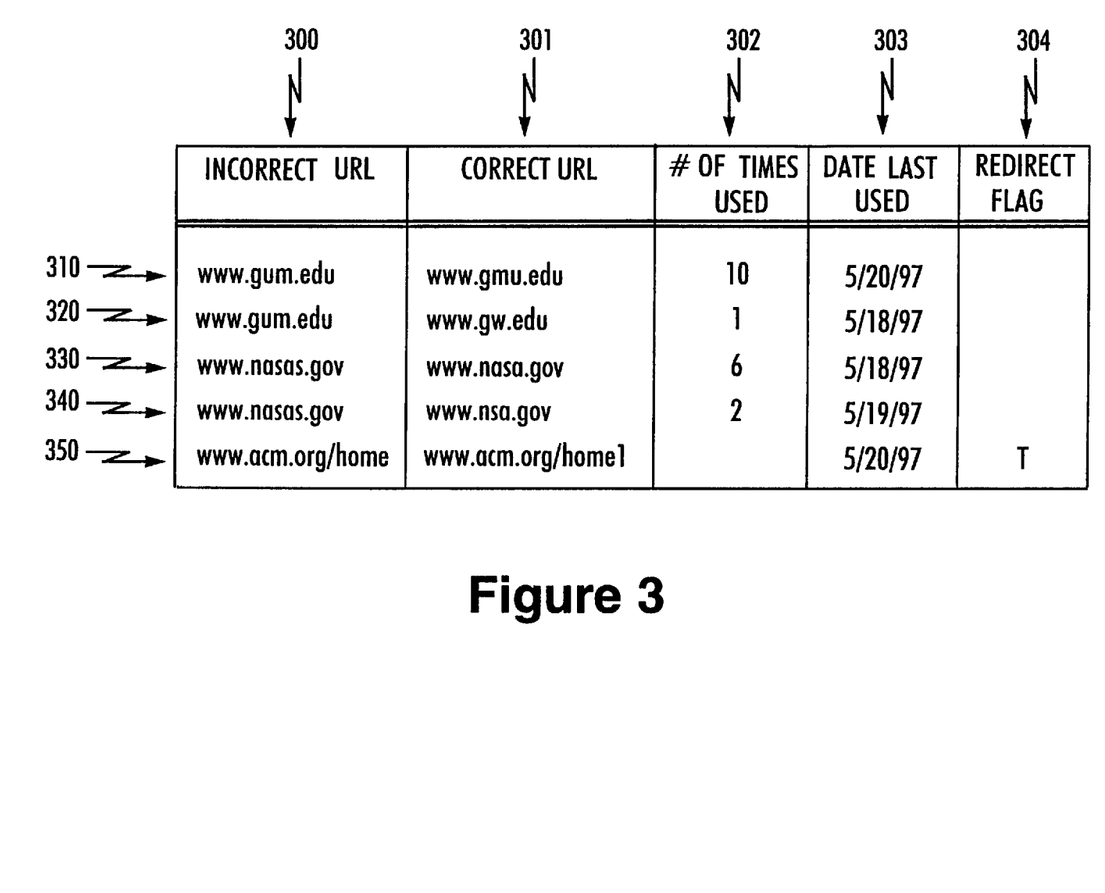
FIG. 3 is a database for storing information about past misspellings and their resolution.

FIG. 3 is a database organized as an exemplary spellcheck list for storing information about past incorrect addresses, such as misspellings and their resolution. An incorrect URL, found in column 300, which matches are entered by a user is used as a key for quickly accessing Potentially Correct URL entries in column 301. The number of times that a particular combination of misspelled URL and Potentially correct URL has been used is tracked in column 302, along with the date it was last used 303. A re-direct flag 304 is optionally maintained to indicate if the Potentially Correct URL is the new (moved) location of a previously valid URL. The rows indicated by 310, 320, 330, 340 and 350 are examples of values stored within the database. The re-direct flag can be set when an attempted access to a URL is returned "moved permanent."

Figure 4:
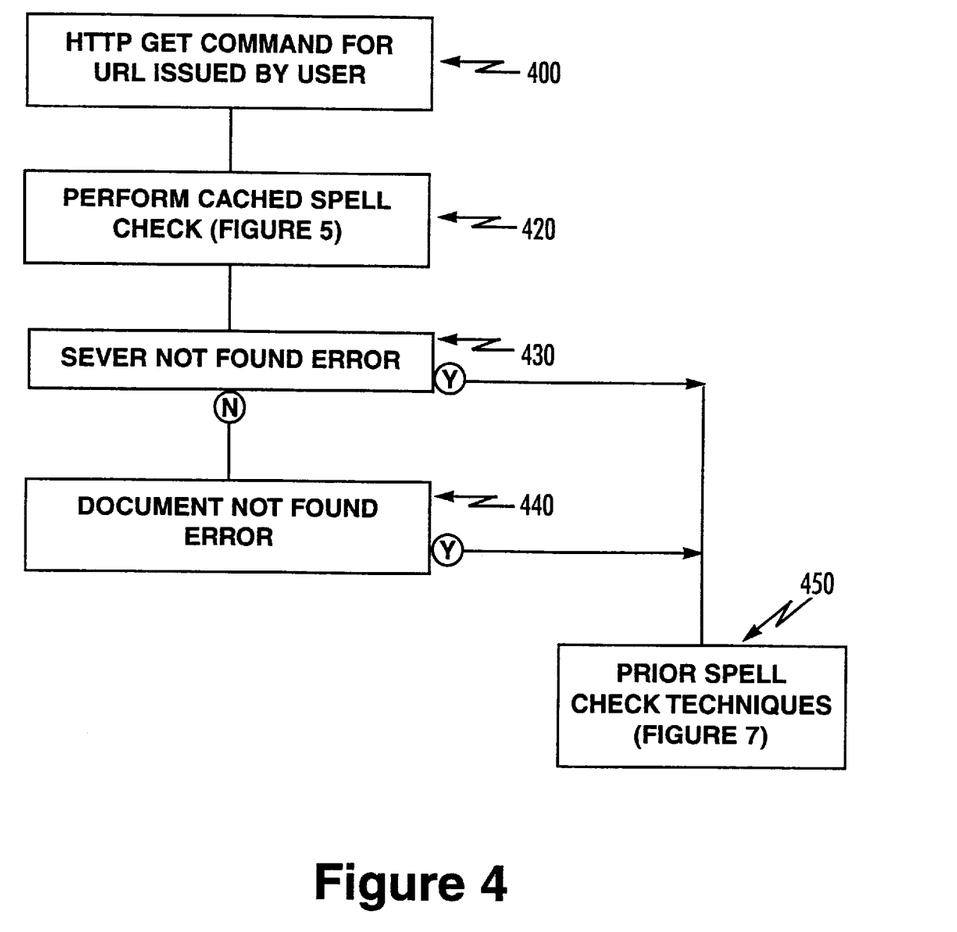
FIG. 4 is a high level flow chart showing an overview of an exemplary process of spell checking in accordance with the invention.
Figure 5:
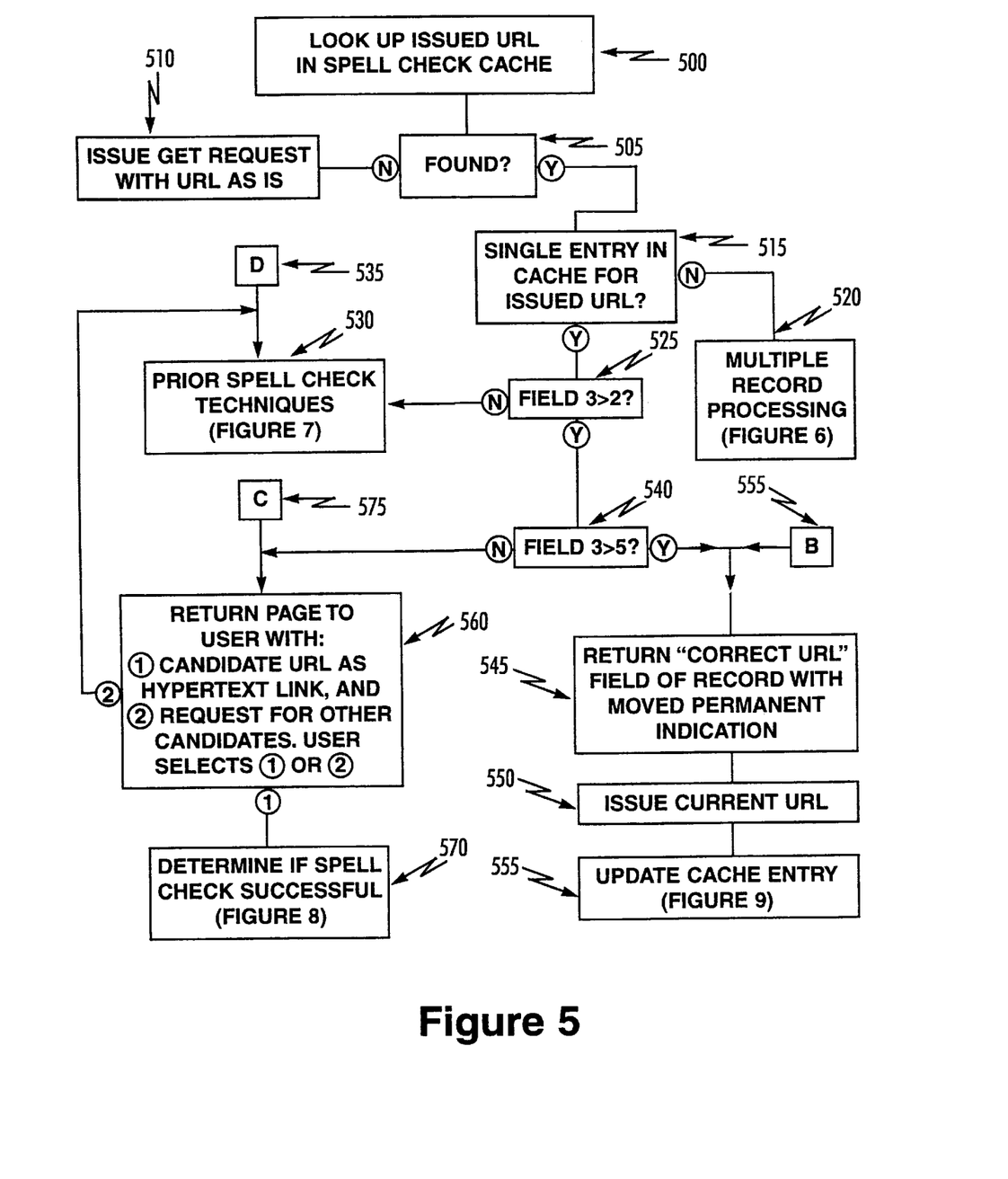
FIG. 5 is a flow chart of an exemplary process for processing cached entries against network addresses used to retrieve information.

FIG. 4 is a flow chart of an exemplary process of spell checking in accordance with the invention. The user issues a GET command for a network address such as a URL (400). The cached spell check process of FIG. 5 is performed (420). The process of FIG. 5 may be performed either before the GET command is sent to the network or after the server is not found. In this example it is preferred to spell check before the GET is issued to reduce consumption of network resources for misspelled URLS. Once the cached spell check has been performed, the corrected URL will be sent over the network with either a successful retrieval or error messages occurring. If the server is not found (430) or if the document is not found on the specified server (440) the prior spell checking techniques illustrated in FIG. 7 are applied (450).

Figure 8:
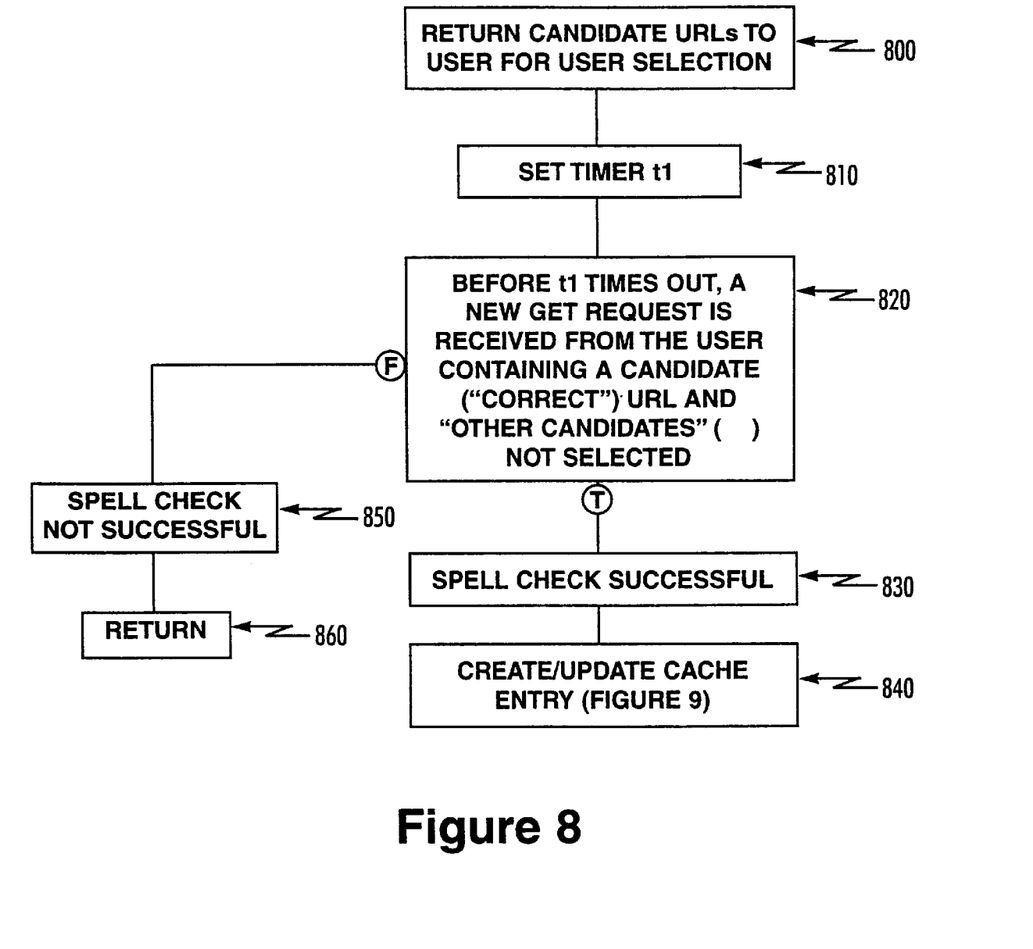
FIG. 8 is a flow chart of an exemplary process used to determine if spell check techniques resulted in a successful corrected spelling in accordance with the invention.
Figure 9:
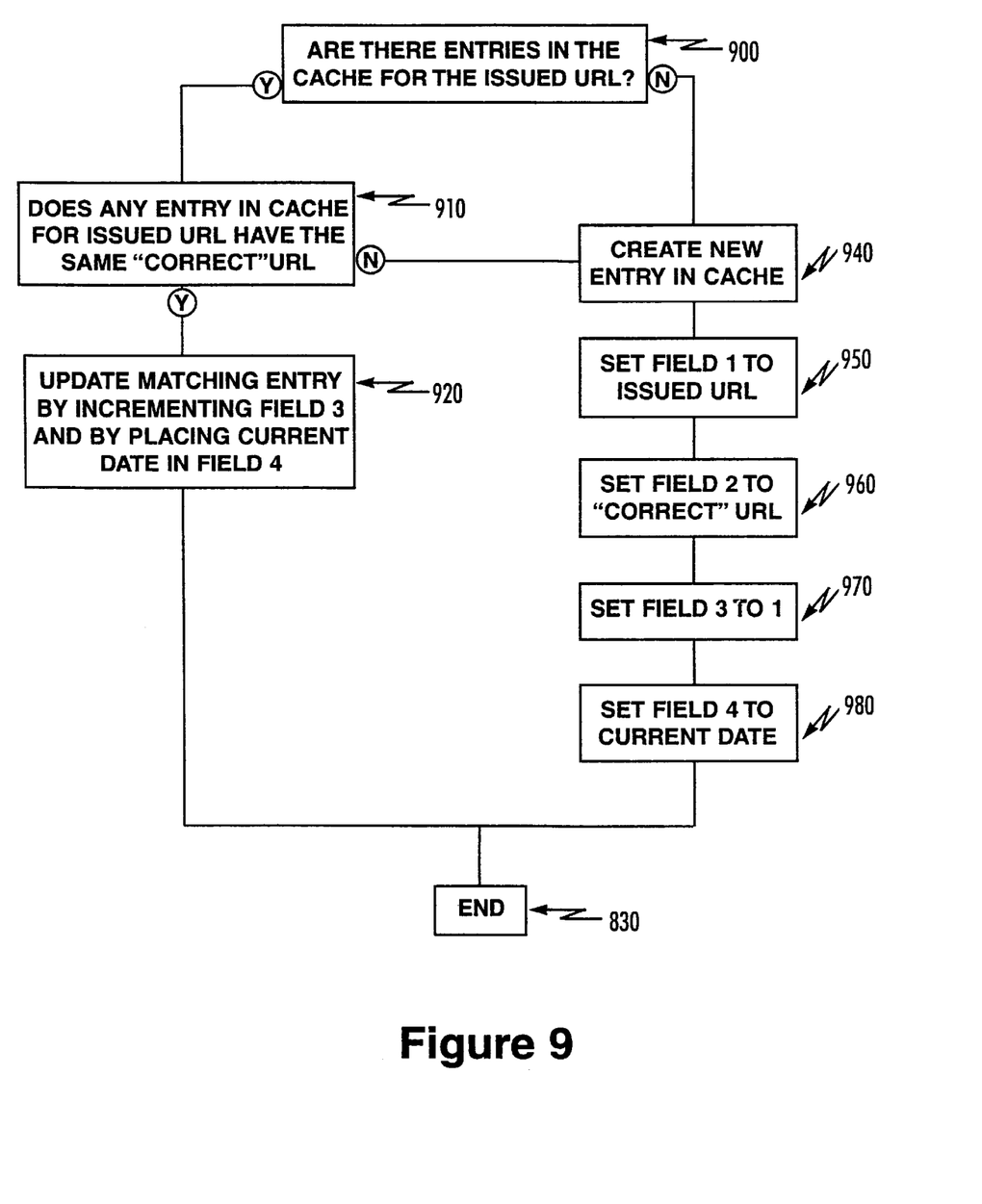
FIG. 9 is a flow chart of a process of updating cache entries in accordance with the invention.

FIG. 5 is a flow chart of an exemplary process for processing cache entries against network addresses used to retrieve information. When a user issues a network address for retrieval, that address is looked up in the spell check cache (500). If it is not found (505-N), the GET request is issued unchanged since presumably the spelling is correct. If it is found in the spell check cache (550-Y), a check is made to see if there is only one entry in the cache for that spelling of the issued URL. If there is more than one, the multiple record processing of FIG. 6 occurs (520). If there is only one (515-Y) a check is made to see if field 3 of that entry is greater than 2 (525). If it is not, prior spell check techniques of FIG. 7 are invoked (530). If field 3 is greater than 2 (525-Y), a check is made to see if field 3 is greater than 5. If it is not, then a page is constructed and returned to the user with the candidate URL as a hypertext link and an alternative selection by which the user to request other candidates (560) If the user selects other candidates, the prior spell check techniques of FIG. 7 are invoked (530). If the user selects the hypertext link (560-1), a check is made to see if the spell check has been successful as shown in FIG. 8 (570). If field 3 is greater than 5 (540-Y), the "Correct URL" field of the record within the cache is returned to the user with a moved permanent indication (545), the correct URL is issued (550) and the cache entry is updated as shown in FIG. 9 (555).

Figure 6:
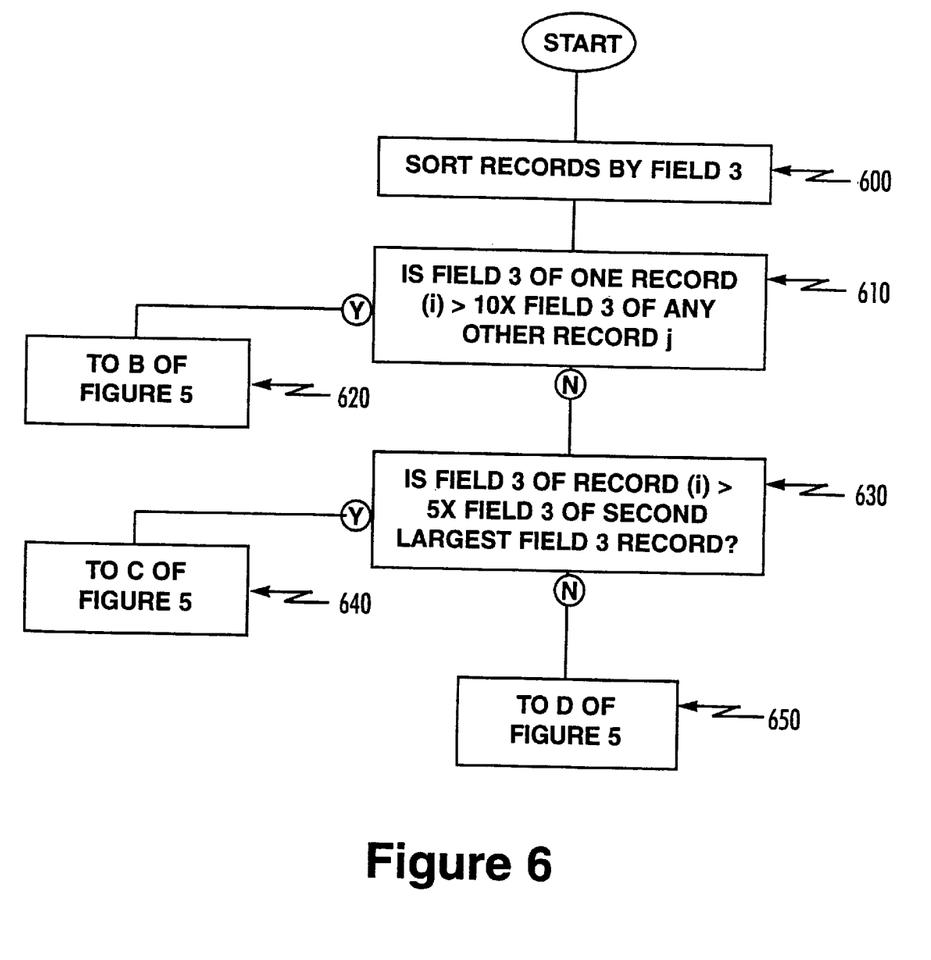
FIG. 6 is a flow chart of an exemplary process for processing multiple cached entries retrieved for a single network address and using them to retrieve information.

FIG. 6 is a flow chart of an exemplary process for processing multiple cache entries resulting from a single network address used to retrieve information. When the URL issued by the user results in a plurality of records being retrieved from the cache, those records are sorted by field 3 (600). If field 3 of the record having the largest value for field 3 is more than ten times the field 3 value of any other record J (610-Y) a moved permanent indication is assumed and if the database of FIG. 3 has a moved permanent column, such as optional column 304, a moved permanent indication is stored in that column and processing begins at point B (555) of FIG. 5. If that is not the case (610-N), a check is made to see if field 3 of record I is more than five times field 3 of the second largest field 3 record (630). If it is, processing jumps to point C of FIG. 5 (575). If it is not, processing jumps to point D (535) of FIG. 5. Thus, the treatment of records within the cache depends on how dominant one record of a plurality of records might be, compared with the others, or in the case of a single record, how certain one is that these misspellings documented in the cache represent the correct spelling.

Figure 7:
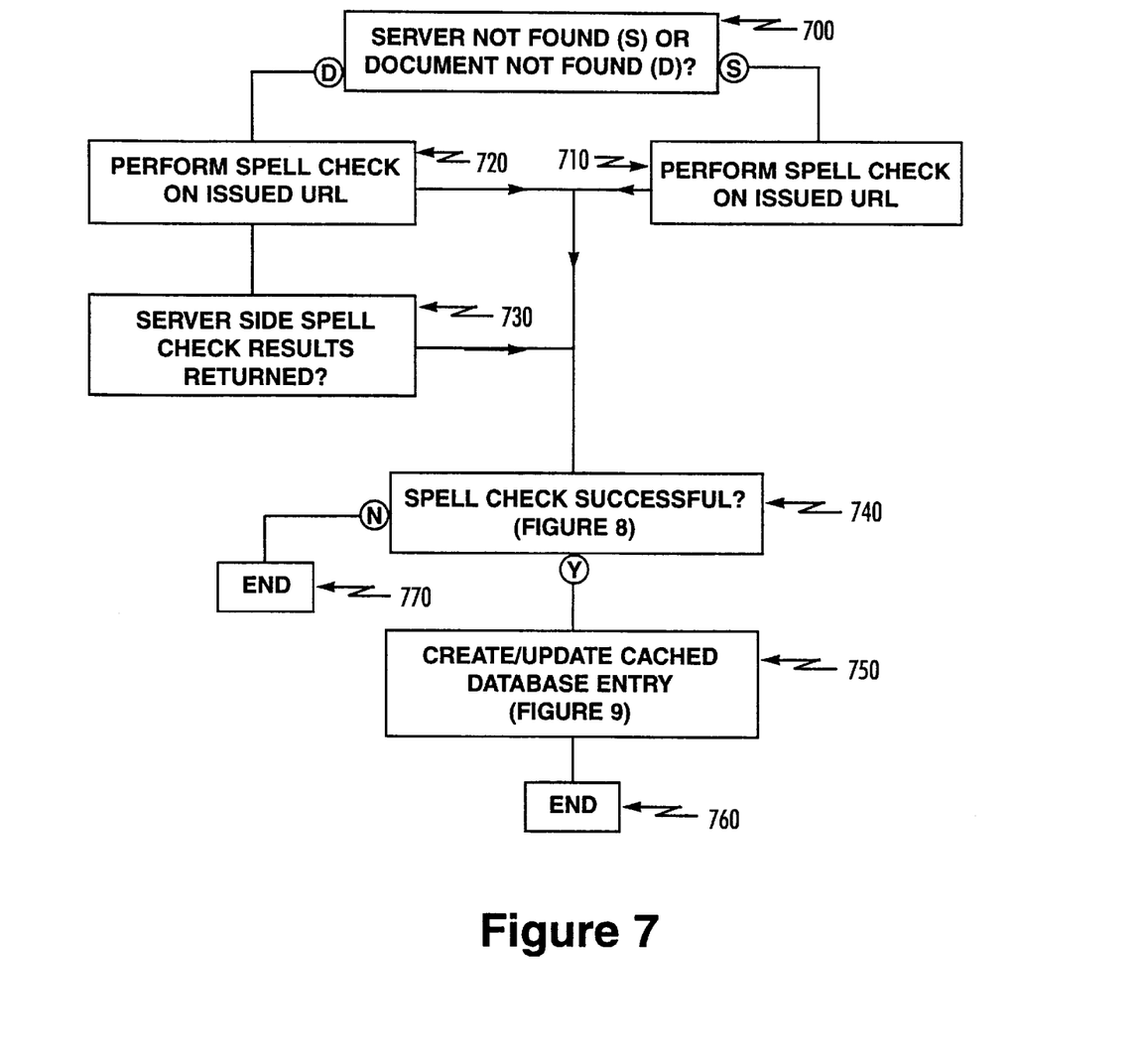
FIG. 7 is a flow chart of an exemplary process which integrates prior spell check techniques with cached spell checking in accordance with the invention.

FIG. 7 is a flow chart of an exemplary process which applies prior spell check techniques to cached spell checking. Once the URL has been issued and the server is not found or a document is not found on a server, different processing occurs. If the server is not found, the spell check on the issued URL will be performed in accordance with the prior art or in accordance with the co-pending application referred to above (710). If the document is not found, implying that the server is found, a spell check is performed on the issued URL and, while that is ongoing, if the server is equipped with server side spell checking as set forth in the aforesaid co-pending application (730), that spell check will be performed and the results will be returned (730). Whether or not any of processes 720, 730 or 710 result in a spell check which is useful to the user is determined by the spell check successful process of FIG. 8 (740). If the spell check is successful (740-Y) an entry in the cached database will either be created or updated (750) and the process ends. If it is not successful (740-N), the process simply ends.

FIG. 8 is a flow chart of an exemplary process used to determine if a spell check technique resulted in a successfully corrected spelling. When a list of candidate addresses are returned to a user for selection (800) a timer is started (810). If, before the timer times out, a new GET request is received from the user containing a candidate "correct" network address and if the "other candidates" selection of FIG. 5, item 560, has not been selected, the spell check is considered successful (830). Otherwise (820-F) the spell check is considered unsuccessful (850) and the process returns. If the spell check is successful the cache entry will either be created or updated as shown in FIG. 9 (840).

FIG. 9 is a flow chart of the process for updating the cached entries. First a check is made to determine if there are any cache entries for the issued URL (900). If there are, a check is made to determine if there is an entry in the cache for the issued URL which has the same "correct" URL as determined by the successful spell check. If there is not (910-N) or if there is no entry at all (900-N), a new entry is created in the cache (940). Field 1 is set to the issued URL (950), field 2 is set to the "correct" URL (960), field 3 is set to one (970) and field 4 is set to the current date (980) and the process ends. However, if an entry does exist for the issued URL with the same correct URL (910-Y) the entry which matches will be updated by incrementing field 3 and by placing the current date in field 4 (920) and the process ends.

Figure 10:
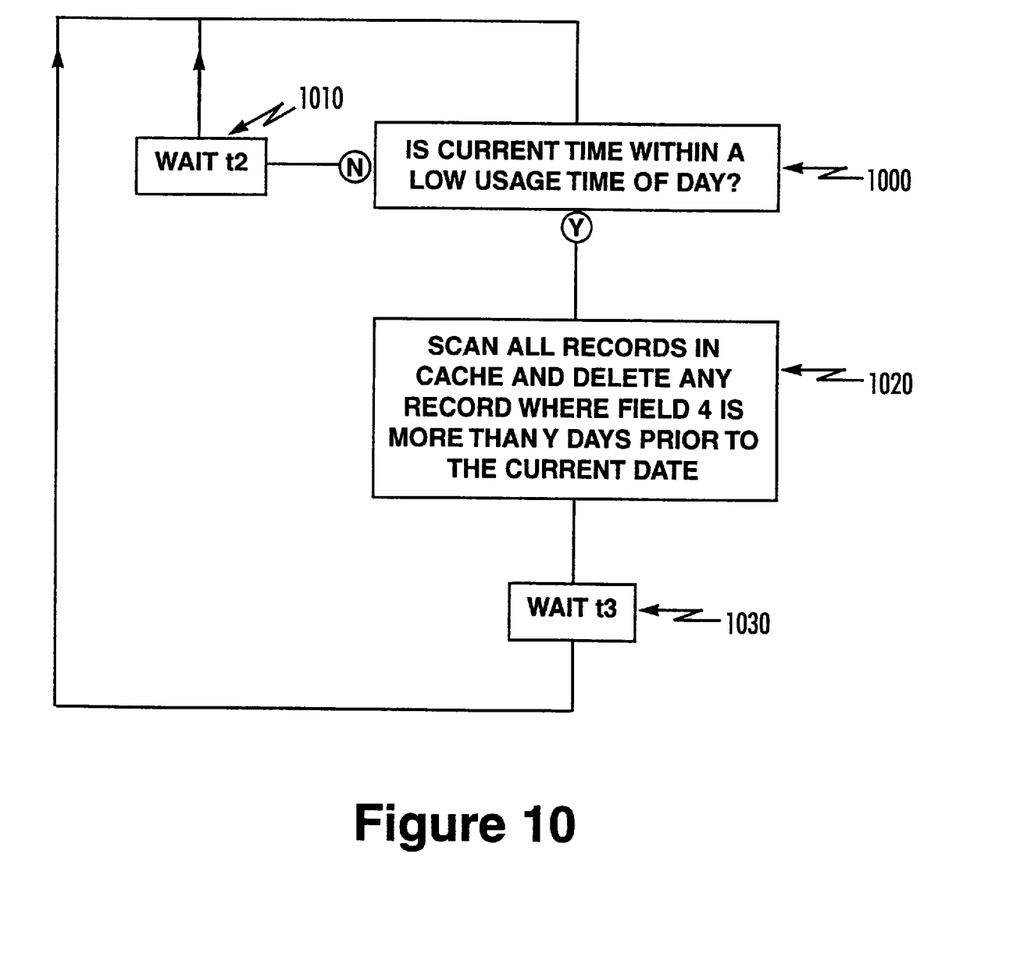
FIG. 10 is a flow chart of a process to purge the cached database of unneeded entries.

FIG. 10 is a flow chart of a process to prune the cached database of unneeded entries. To keep the size of the cached database reasonable, it will periodically need to be pruned of entries that have not been used in some reasonable period of time, such as Y days. Typically, this process should occur during periods of low load. Accordingly, a check is made to see if the current time is within a low usage time of day (1000). If it is not (1000-N), a wait state is entered which lasts for a period of time T2 (1010). If it is within a low usage time of day (1000-Y), all records in the cache are scanned and any record which has field 4 older than Y days before the current date is deleted. A second wait state is entered (1030) before the process is tried again.

An alternative embodiment of this invention may include a process of checking to see if the same user is continually entering the same misspelled URL. In this case, it would be desirable to not increment the cached database record when the user does it again to avoid an exaggerated "hit" rate. Systems that support customer authentication by using, for example, server generated cookies, would provide the information necessary to track which users are associated with which database records. If no such customer tracking utility is provided, the users IP address could be used instead with the caveat that many users from a single ISP or proxy server might appear as the same user.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. Computer apparatus for checking network addresses used for retrieval of information, comprising:
   a. a users' interface for receiving connections from a plurality of users;
   b. a network interface for providing network access to said users; and
   c. a computer controlling said users' interface and said network interface, said computer configured to provide checking of at least one network address submitted by at least one of said users by comparing said at least one network address with a cache containing entries relating incorrect addresses submitted by users and corresponding corrected addresses.

2. Computer apparatus of claim 1, in which said entries also include an indication if a destination specified by said network address has moved permanently to a new address.

3. Computer apparatus of claim 1, in which said computer is configured further to provide traditional spell checking in combination with cache checking.

4. Computer apparatus of claim 1, in which said computer is configured to receive spell check information from a server over said network interface and incorporate results into said cache.

5. Computer apparatus of claim 1 in which a corrected address is sent for an incorrect address over the network interface.

6. Computer apparatus of claim 5 in which said corrected address is sent after an indication has been received that the destination indicated by said incorrect address was not found.

7. Computer apparatus of claim 1 in which said cache is updated when an incorrect address is corrected by a user.

8. Computer apparatus of claim 1 in which cache entries are deleted when they have not been used for more than a pre-determined period of time.

9. Computer apparatus of claim 8 in which cache entries are deleted during periods of low usage.

10. A system for retrieving information over a network in response to network addresses, comprising:
   a. a network;
   b. at least one server connected to said network; and
   c. computer apparatus providing network access to a plurality of users, said computer apparatus maintaining a cache of entries relating incorrect addresses submitted by said users with correct network addresses and correcting an incorrect address submitted by a user based on information contained in said cache.

11. The system of claim 10 in which at least one server provides server side spell checking of network addresses received and returns candidate spellings to a user for a network address on said server, submitted by said user, which has not been found.

12. The system of claim 11 in which said cache is updated when said user selects one of said candidate spellings.

13. The system of claim 10 in which said computer apparatus is also configured for performing spell checking of a network address submitted by a user and for adding or modifying an entry in said cache when a corrected network address is determined.

14. A method of retrieving information over a network, comprising the step of:
   a. providing an element for checking at least one network address by comparing said at least one network address with a cache containing entries relating incorrect addresses submitted by a plurality of users and corresponding corrected addresses and sending a corrected address from said cache to said network in place of said one network address.

15. The method of claim 14 in which misspellings found by server side spell checking are included in said cache.

16. The method of claim 15 in which misspellings found by local spell checking are included in said cache.

17. A computer program product, comprising;
   a. a memory medium; and
   b. a computer program, stored on said memory medium, said computer program containing instructions for checking at least one network address submitted by a user by comparing said at least one network address with a cache containing entries relating incorrect addresses submitted by a plurality of users and corresponding corrected addresses.

18. The computer program product of claim 17 in which said computer program further comprises instructions for incorporating misspellings found by a server in said cache.

19. The computer program product of claim 17 in which said computer program further comprises a local spell check process and instructions for incorporating misspellings found by said local spell check process in said cache.

20. The computer program product of claim 17 in which said computer program is transmitted from said memory medium over a network interface.

* * * * *